United States Patent [19]

Sherwood, Jr. et al.

[11] Patent Number: 5,254,513

[45] Date of Patent: Oct. 19, 1993

[54] METHOD FOR THE REACTIVATION OF SPENT ALUMINA-SUPPORTED HYDROTREATING CATALYSTS

[75] Inventors: David E. Sherwood, Jr., Port Arthur, Tex.; Johnnie R. Hardee, Jr., Arkadelphia, Ark.

[73] Assignee: Texaco, Inc., White Plains, N.Y.

[21] Appl. No.: 702,480

[22] Filed: May 20, 1991

[51] Int. Cl.$^5$ .............................. B01J 20/34
[52] U.S. Cl. ..................... 502/55; 502/37; 502/35; 502/31; 502/514; 502/516; 208/52 CT; 208/305
[58] Field of Search ............ 502/37, 38, 55, 514, 502/516, 31; 208/52 CT, 305

[56] References Cited

U.S. PATENT DOCUMENTS

| | | | |
|---|---|---|---|
| 1,558,163 | 10/1925 | Hall | 502/31 |
| 1,633,871 | 6/1927 | Prutzman | 502/31 |
| 2,867,497 | 1/1959 | Houdry et al. | 423/212 |
| 3,297,400 | 1/1967 | Eastwood | 423/212 |
| 3,565,820 | 2/1973 | Coons, Jr. et al. | 423/212 |
| 3,772,211 | 11/1973 | Mounce | 502/31 |
| 3,809,644 | 5/1974 | Johnson et al. | 208/210 |
| 4,454,240 | 6/1984 | Ganguli | 502/26 |
| 4,515,899 | 5/1985 | Click et al. | 502/35 |
| 4,621,069 | 11/1986 | Ganguli | 502/26 |
| 4,632,748 | 12/1986 | Bertus et al. | 502/31 |
| 4,720,473 | 1/1988 | Welch et al. | 502/21 |
| 4,795,726 | 1/1989 | Schaper et al. | 502/26 |

FOREIGN PATENT DOCUMENTS

| | | | |
|---|---|---|---|
| 1159402 | 10/1979 | Canada | 209/68 |
| 1526927 | 10/1978 | United Kingdom . | |

Primary Examiner—Helane Myers
Attorney, Agent, or Firm—James L. Bailey; Jack H. Park; Walter D. Hunter

[57] ABSTRACT

Spent or inactive alumina-supported catalysts removed from a catalytic hydrotreating process and having carbonaceous and metallic deposits thereon are reactivated. After a solvent wash to remove process oils, the spent catalyst is contacted with steam at a temperature of 1000° to about 1250° F. for a period of about 2 to about 5 hours to form a reactivated catalyst suitable for reuse in a catalytic hydrotreating process. Optionally, the steam-treated catalyst can be regenerated by contact with an oxygen-containing gas at a temperature of about 700° to about 900° F. to remove carbon deposits from the catalyst, or, alternatively, the steam-treated catalyst can be acid-leached to remove undesired metals and then contacted with an oxygen-containing gas at an elevated temperature to remove carbon deposits.

18 Claims, No Drawings

METHOD FOR THE REACTIVATION OF SPENT ALUMINA-SUPPORTED HYDROTREATING CATALYSTS

BACKGROUND OF THE INVENTION

1. Field of the Invention

This invention relates to a method for reactivation of spent inactive alumina-supported catalysts from a catalytic hydrotreating process. More particularly, this invention relates to method in which spent catalyst withdrawn from a hydrotreating process, such as an H-Oil ® hydrogenation process in which ebullated-bed reactors are employed, is first stripped of process oil by, for example, washing with a hydrocarbon solvent and the oil-free catalyst is then contacted with steam at an elevated temperature for a period of from about 2 to about 5 hours thereby providing a reactivated catalyst. In another aspect of this invention the reactivated catalyst is additionally regenerated by burnoff of the carbon and sulfur deposits under controlled conditions in the presence of an oxygen-containing gas or, if desired, the reactivated catalyst can be subjected to a rejuvenation step in which a part or substantially all of the metallic deposits are removed after which the rejuvenated catalyst can be regenerated by burnoff of the carbon and sulfur deposits.

During catalytic reaction processes, as exemplified by hydrotreating processes employing ebullated-bed reactors, the catalysts employed gradually are deactivated by virtue of an accumulation of carbonaceous deposits on the catalyst particles, and by virtue of various metallic elements such as vanadium, nickel, etc. being deposited thereon.

There is a need in the art for a practical method for conveniently reactivating spent hydrotreating catalyst withdrawn from a fluidized-bed catalytic reactor system, such as a processing system utilizing ebullated-bed or continuous stirred tank reactors in hydroprocessing high sulfur and metals-containing hydrocarbon feedstocks.

2. Prior Art

Canadian Patent No. 1,159,402 discloses a process for the recovery of used, contaminated catalyst according to particle density differences by fluidization in light liquid hydrocarbon fractions boiling in the range of 200° to 450° F., such as light naphtha, kerosene, fuel oil or water. This process is suitable for treating used catalyst derived from fluidized- or ebullated-bed reactors such as H-Oil ® processes which involve continuous or periodic withdrawal of portions of used catalyst and their replacement with fresh catalyst thereby producing low-density and high-density fractions of used catalyst. The low-density fraction of the used catalyst may be regenerated by carbon burnoff after removal from the light hydrocarbon fluidization unit and before being returned to the reactor. The high-density fraction of used catalyst is, optionally, processed for recovery of deposited metals.

U.S. Patent No. 3,809,644 discloses a process for multiple stage hydrodesulfurization of high sulfur, metals-containing residium stocks in a multiple stage ebullated-bed hydrogenation process where catalyst used in the final stage reaction zone is removed and introduced without any additional treatment such as carbon burnoff, etc. to the proceeding reation zone thus extending the ativity and effective life of the catalyst. In this process all fresh make-up hydrogen for the process is injected into the final reaction zone so that the hydrogen sulfide in the gas leaving that reaction zone is maintained below about three mole percent, thus substantially improving the desulfurization reaction rate in that reactor. The partially deaviated catalyst backstaged from the final stage reactor becomes guard-type contact solids for metals removal in the preceding stage reactor or reactors. Metals removal from the residual feedstocks can be maintained at the desired level without using high reaction temperatures. This process is reported to be especially effective when three reaction zones connected in series are employed and is applicable for producing low sulfur fuel oil from feedstocks containing 2 to 5 weight percent sulfur and having metals content ranging from about 20 p.p.m. vanadium to as much as 600 wppm (i.e., weight parts per million) vanadium.

U.S. Pat. No. 4,621,069 discloses a process for effective regeneration of used catalyst to remove deposited carbon and sulfur compounds by staged controlled burnoff and in this process the burnoff is accomplished by staged burnoff in multiple zones wherein the used particulate ctalyst is introduced into a first zone where the catalyst in contacted at 300°–500° F. with an inert gas for 1–2 hours residence time to evaporate liquid components from the catalyst; the oil-free catalyst is then passed to a second zone wherein the catalyst in a thin bed is contacted at 780°–800° F. with a gas containing 0.5 to 1.0 V % oxygen in an inert gas for 4–6 hours residence time and finally, the partially regenerated catalyst is passed to a third zone where the catalyst in a thin bed is contacted with a gas containing 1–2 V % oxygen in an inert gas at a temperature of 800°–850° F. for 4–6 hours residence time and finally the further regenerated catalyst is passed to a fourth zone where the catalyst is contacted at 800°–850° F. with a gas containing 2–6 V % oxygen in an inert gas for 6–10 hours residence time to complete burnoff of carbon and sulfur deposits from the catalyst.

U.S. Pat. No. 4,720,473 discloses a process for treating a spent hydrotreating catalyst having an L/D greater than one by (1) stripping volatizable hydrocarbons to form free-flowing catalyst particles, (2) passing the free-flowing catalyst particles to a rotating drum length grading unit having indentations in the cylindrical wall where the catalyst particles with a length less than $L_1$ are separated from the desired catalyst particles having a length greater than $L_1$ the latter fraction comprising lightly contaminated particles and more heavily contaminated catalyst particles (Product A), (3) passing the Product A to a density grading unit utilizing gas suspension wherein the lightly metals contaminated catalyst particles are separated from Product A by contacting the suspended particles with an upwardly-sloping, vibrating surface. In a final step, the lightly metals contaminated catalyst particles having a length greater than $L_1$ are passed to a regeneration zone in which carbonaceous deposits are removed in a controlled burnoff in the presence of an oxygen-containing inert gas at a temperature of about 200° to 700° C. Alternatively, the lightly contaminated catalyst particles from the density grading zone can be passed to a rejuvenation zone where the catalyst particles are acid leached to remove undesired metals from the catalyst particles which are then passed to a regeneration zone.

U.S. Pat. No. 4,454,240 discloses a catalyst regeneration process which includes a metal contaminants removal step. This procedure is particularly useful for recovering used catalyst from catalyst bed reaction systems such as H-Oil ® and H-Coal ® hydrogenation processes using ebullated-bed reactors, from fixed-bed catalytic reaction systems, and also from fluid catalytic cracking (FCC) processes. Preferred feedstocks for the reactor processes are from petroleum and coal. Catalyst having contaminant metals removed and regenerated by this process is said to have activity essentially equal to fresh catalyst. In the process of this patent the used catalyst is first washed with a hydrocarbon solvent such as naphtha, toluene, or mixtures thereof, etc. to remove process oils, the oilfree catalyst is then contacted for at least 5 minutes with an aqueous solution of sulfuric acid and an ammonium ion at a temperature of from 60°-250° F. which converts the metal contaminants to the respective soluble sulfate compounds. The metals-laden solution is drained off, after which the treated catalyst is washed with water to remove the residual aqueous solution and, in a final step, the washed, treated catalyst is subjected to a carbon burnoff in which the catalyst is contacted with a 1-6 V % oxygen in an inert gas mixture to remove carbon deposits.

U.S. Pat. No. 4,795,726 discloses a process for regenerating a spent alumina-based catalyst used in treating metal contaminated hydrocarbon feedstocks consisting essentially of an alumina support and containing one or more metals with hydrogenating activity in which the catalyst after being conventionally deoiled with toluene/pentane is contacted with steam at a temperature ranging from 390°-930° F. and then regenerated by carbon burnoff in the presence of an oxygen-containing gas. In a final step the regenerated catalyst is rejuvenated by treatment with a basic medium comprising a buffered aqueous solution of an ammonia or ammonium salt of a weak acid having a pH of 9-12 at a temperature of 5°-100° C.

U.S. Pat. No. 4,515,899 discloses a process for extending the useful life of vanadium-phosphorus-oxygen catalyst used in the production of maleic anhydride in fixed bed reactors in which the catalyst is regenerated by first contacting the catalyst with a phosphorus compound and finally contacting the catalyst with a flow of steam at a temperature of about 575° F. to about 1110° F.

British Patent Application 1526927 (October, 1978) discloses a process for the recovery of vanadium from a catalyst which has become inactivated in a process where a vanadium-containing hydrocarbon oil has been treated with hydrogen at elevated temperature and pressure. In this process the deactivated catalyst is treated with steam at a temperature above 390° F. and in particular above 480° F. for the purpose of removing at least a part of the sulfur and/or the coke present on the deactivated catalyst and then treated with an oxygen-containing gas prior to an acid extraction for the recovery of vanadium.

SUMMARY OF THE INVENTION

This invention provides a method for reactivating spent or inactive alumina-supported catalysts having carbonaceous and variable metals contaminant contents so that the reactivated catalyst material having a relatively high activity is suitable for further use in a petroleum residua hydroconversion process such as H-Oil ® hydrogenation process using ebullated-bed or continuous stirred tank reactors.

Specifically, this invention relates to a process for reactivating spent alumina-supported hydrotreating catalyst which is particularly useful for reactivating spent hydrotreating alumina-supported catalyst withdrawn, for example, from an H-Oil ® reactor. The process comprises (1) stripping process oil from the spent hydrotreating catalyst having carbonaceous and metallic deposits thereon by, for example, washing the catalyst with a hydrocarbon solvent thus rendering the catalyst particles free flowing, (2) contacting the free-flowing catalyst with steam at an elevated temperature and recovering the reactivated catalyst of relatively high activity suitable for returning to the hydrotreating reactor. Optionally, the reactivated catalyst fractions can be passed to a regeneration zone where the carbonaceous deposits are removed by carbon burnoff or the reactivated catalyst can be acid leached prior to regeneration to remove undesired metals.

The present invention thus provides a method for reactivating a spent or used alumina-supported hydrotreating catalyst while substantially retaining the physical properties thereof which comprises:

a) stripping process oils from the spent catalyst,
b) contacting the spent alumina-supported catalyst with steam at an elevated temperature in a steam-treating zone, and
c) recovering a reactivated alumina-supported catalyst from the said steam-treating zone.

DESCRIPTION OF THE PREFERRED EMBODIMENTS

The process of this invention is useful for treating spent catalyst withdrawn from a wide range of hydrotreating reactors including hydrodesulfurization units and this catalyst reactivation process is particularly useful for treating spent catalyst withdrawn from, for example, an ebullated-bed single stage hydrodesulfurization unit or from any of the stages of a multiple stage hydrodesulfurization ebullated-bed unit where catalysts comprising an oxide of nickel or cobalt and an oxide of tungsten or molybdenum supported on a porous alumina support, for example, are employed.

Although a wide variety of spent or used hydro-treating catalysts can be reactivated utilizing the process of this invention, it is especially useful for treating spent hydrotreating catalysts having a regular geometric shape formed by extrusion or pelletizing and preferably which have a generally cylindrical shape with a generally circular cross-section and having a cross-sectional diameter ranging from about 0.030 to about 0.065 inches.

Catalyst-type particles which can be reactivated by the process of this invention comprise any of the conventional shaped alumina-supported or silica-supported catalysts which usually contain active metals such as cobalt, molybdenum, nickel, phosphorus, tungsten or titanium used in hydroconversion or hydrorefining of hydrocarbons and particularly with regard to hydrotreating or hydrodesulfurization of residuum feedstocks.

THE PROCESS OF THIS INVENTION (A) Removal of Process Oils to Form Free-Flowing Catalyst Particles In the reactivation process of this invention spent hydrodesulfurization catalyst which has been removed from an ebullated-bed reactor such as an H-Oil ® reactor operating under hydrodesulfurization conditions is sent to a catalyst stripping unit for deoiling. In this unit the spent catalyst particles, for example, are washed batchwise or in a continuous manner with a hydrocarbon solvent liquid for the purpose of removing process oils. A variety of methods may be utilized in washing the used catalyst such as by (a) adding the used catalyst with mixing to a tank containing the solvent liquid, or (b) the spent catalyst can be introduced into a catalyst washing unit where solvent is circulated uniformly upwardly through a generally vertical column by means of a pump and a flow distributor. In both washing methods the hydrocarbon can be, for example, naphtha, toluene, etc., and mixtures thereof. Heat is added to the hydrocarbon solvent to maintain the solvent temperature at about 200°-300° F. in both methods (a) and (b). After the spent catalyst particles have been washed, free-flowing catalyst particles are obtained by drying the particles at a low temperature (i.e., <250° F.) in air or in air diluted with an inert gas such as nitrogen or at even lower temperatures (ambient) under vacuum conditions.

Alternatively, the catalyst can be deoiled by stripping at high temperature (i.e., >500° F.) in a flowing inert gas such as nitrogen until no additional process oil is removed.

(B) Steam Treatment of Spent Free-Flowing Catalyst Particles

The dry, deoiled free-flowing catalyst particles are next sent to a steam treatment unit in which the catalyst particles are contacted with steam at an elevated temperature ranging from 1000° to about 1250° F. and preferably at a temperature of about 1150° to about 1250° F. It has been found that a surprising increase in the hydrodesulfurization activity of the alumina-supported catalyst results when the steam treatment of the deoiled used catalyst is conducted at the elevated temperatures set out above. If desired, steam diluted with up to 50 percent nitrogen may be employed in treating the used, free-flowing catalyst particles. If the steam-treated catalyst particles are subsequently regenerated by treatment with an oxygen-containing gas at elevated temperatures, the regeneration process is easier to control and requires much less time. In an initial heating step the used catalyst particles may be preheated to the desired elevated temperatures by contacting the catalyst particles with an inert gas such as nitrogen prior to the steam treatment method of this invention.

EXAMPLES 1-5

In these examples samples of about 100 cc of used catalyst particles withdrawn from an ebullated-bed reactor processing residual crudes having a boiling point range such that at least 89 volume percent boils at temperatures greater than or equal to 1000° F. and sulfur contents in excess of 2 weight percent operating under hydro-desulfurization conditions were placed as a fixed bed in a steaming unit. The catalyst treated in these examples was Criterion ®HDS-1443B, a nickel-molybdenum catalyst, on an alumina support. Each used catalyst sample was, prior to being placed in the steaming unit, washed with toluene at a temperature of about 230° F., afterwards dried in air at a temperature of about 250° F. and the hydro-desulfurization activity of the deoiled catalyst was determined by the hydrodesulfurization micro-activity test (HDS-MAT test). After the deoiled, used catalyst had been loaded into the steaming unit, which was surrounded by a temperature controlled furnace, the fixed catalyst bed thus formed was heated to the desired steaming temperature with flowing nitrogen. Water at the rate of 50 cc. per hour was introduced into a steam generator and steam leaving this unit was sent in a downflow manner through the catalyst bed in the steaming unit. The first water effluent (i.e., the condensate) exiting from the steaming unit was extremely black in color and as the steaming period was continued the water effluent was less colored and finally at the end of the three hour steaming period the effluent was completely clear and colorless. At the conclusion of the steaming period heating was stopped, the catalyst sample was allowed to cool under flowing nitrogen and finally the hydrodesulfurization activity of the steamed catalyst was determined by the HDS-MAT test.

The V/Mo atomic ratio of the deoiled catalysts, the hydrodesulfurization activity of the deoiled catalysts as well as the hydrodesulfurization activity of the deoiled catalysts after steaming at 1000° F. for three hours (HDS-MAT tests) for Examples 1-5 were determined and these values are reported in Table I which follows:

TABLE I

| | STEAM TREATMENT OF DEOILED CATALYST | | | | |
|---|---|---|---|---|---|
| Example Number | 1 (2581-XF-84) | 2 (1210-FX-91) | 3 (5269-XX-01) | 4 (1208-BX-91) | 5 (5463-XX-01) |
| Reactor | A | B | C | B | D |
| Age,bbl/lb | 3.44 | 3.46 | 1.14 | 4.81 | 7.0 |
| Feed | E then F | E then F | G | E then F | E then F |
| Catalyst Type | Criterion ® HDS-1443B | Criterion ® HDS-1443B | Criterion ® HDS-1443B | Criterion ® HDS-1443B | Criterion ® HDS-1443B |
| V/Mo Atomic Ratio | 0.36 | 1.45 | 2.14 | 2.51 | 3.29 |
| % HDS, Toluene washed | 7.8 | — | 4.4 | 5.7 | 4.5 |
| % HDS, Toluene washed then steamed at | 11.6 | — | 6.5 | 6.4 | 6.5 |

TABLE I-continued

STEAM TREATMENT OF DEOILED CATALYST

| Example Number | 1 (2581-XF-84) | 2 (1210-FX-91) | 3 (5269-XX-01) | 4 (1208-BX-91) | 5 (5463-XX-01) |
|---|---|---|---|---|---|
| 1000° F. | | | | | |

A — second-stage reactor of a two-stage ebullated-bed H-Oil ® unit operated with daily catalyst replacement.
B — first-stage reactor of a two-stage ebullated-bed H-Oil ® unit operated with daily catalyst replacement.
C — single-stage reactor ebullated-bed H-Oil ® unit operated without daily catalyst replacement.
D — single-stage reactor ebullated-bed H-Oil ® unit operated without daily catalyst replacement.
E — vacuum resid from Alaskan North Slope Crude (1000° F.+ vol. % 89.2; Sulfur 2.30; Vanadium = 82 wppm).
F — vacuum resid (1000° F.+ vol 89.90; Sulfur 3.9 wt %; Vanadium = 102 wppm).
G — vacuum resid from Isthmus Crude (1000° F.+, vol. % 95.1; Sulfur 4.03 wt. %; Vanadium = 321 wppm).

Samples of the deoiled catalyst of Example 2 were each contacted with steam for three hours at 1100° F., 1200° F., and 1300° F. respectively, and the H/C atomic ratio for the toluene washed catalyst, for the three steamed samples as well as the hydrodesulfurization activity (HDS-MAT test) for the three thus-treated catalyst samples were determined. The results are reported in Table II which follows:

TABLE II

STEAM TREATMENT OF DEOILED CATALYST OF EXAMPLE 2 AT 1100°–1300° F.

| Treatment | % HDS | H/C atomic ratio |
|---|---|---|
| Toluene washed | — | 0.96 |
| Steamed 3 hours at 1100° F. | 7.90 | 0.30 |
| Steamed 3 hours at 1200° F. | 11.2 | 0.44 |
| Steamed 3 hours at 1300° F. | 10.5 | 0.57 |

The data of Table II show the surprising increase in hydrodesulfurization activity (% HDS) achieved at elevated steaming temperatures and especially the % HDS resulting at about the 1200° F. treatment. Additionally, the low H/C atomic ratios on each steamed sample indicates that entrapped oil was successfully being removed leaving only a graphite-like substance in the catalyst pores.

In the HDS-MAT procedure a one-half gram of ground, calcined catalyst is presulfided with 10% $H_2S/H_2$ flowing at 50 cc/minute for one hour at 750 F. The catalyst is then exposed to a model feed and hydrogen for approximately four hours. Cuts are taken periodically and analyzed by gas chromatograph for the conversion of benzothiophene to ethylbenzene. The average hydrodesulfurization activity is reported as C 0.5 g.

The HDS-MAT run conditions are as follows:

| Temperature | 550 F |
|---|---|
| Pressure | Atmospheric |
| Chargestock | 0.857 molar benzothiophene in ASTM reagent grade heptane (3.68 wt % S) |
| Space Velocity | 4 hr.$^{-1}$ |
| Catalyst Charge | 0.5 grams |
| Hydrogen Flow | 50 cc/min. of ultra-high purity $H_2$ |

The calculation is performed as follows:

$$HSD - MAT\ C\ 0.5\ g\ @\ 550°\ F. - Average\ HDS = \left(100 \times \left(1.0 - \frac{Sulfur\ in\ product}{Sulfur\ in\ feed}\right)\right)$$

(C) Catalyst Regeneration

Optionally, the catalyst fraction recovered from the steam treating zone is passed to regeneration zone for removal of carbonaceous deposits. The regeneration zone may be a conventional regenerator in which a gas containing 1-6 V % oxygen (e.g., air diluted with an inert gas such as nitrogen), or air, is supplied to the regenerator under combustion conditions to oxidize the carbonaceous deposits to carbon dioxide which is withdrawn from the regenerator. Suitable oxidation temperatures range from about 700° to about 900° F.

The reactivated catalyst fraction recovered from the regeneration zone may, if desired, be passed to a separate density grading zone. This step may be desirable since some catalyst particles are more contaminated with nickel and vanadium than other particles. A number of processes suitable for density grading of used or spent catalyst particles have been described in the art. For example, density grading of spent or used catalyst particles using an upward flow of gas such as air through an inclined vibrating surface to produce a light catalyst fraction which contains little or no heavy metal contamination is described in U.S. Pat. No. 4,720,473, the disclosure of which is incorporated herein by reference. Canadian Patent No. 1,159,402 sets out a process for the recovery of lightly contaminated used or spent catalyst particles according to particle density differences by using a fluidization method in which a catalyst bed of used catalyst is fluidized by flowing a light hydrocarbon liquid upwardly through the bed thereby accomplishing substantial segregation of the catalyst particles into an upper less metal contaminated fraction and a lower more contaminated fraction followed by recovery of the upper fraction. The disclosure of Canadian Patent No. 1,159,402 is incorporated herein by reference.

(D) Acid Leaching of Catalyst Particles

In a final optional step the reactivated catalyst particles after steam treatment and prior to regeneration are sent to a rejuvenation unit for the purpose of removing metallic deposits where the catalyst particles are preferably first washed with water to fill the catalyst pores. Next, the catalyst particles are passed to an acid treating column and a solution of 5-50 weight percent sulfuric acid and 0-10 weight percent ammonium ion is introduced into the lower section of the column which is made of corrosion resistant material. The acid solution is recovered from the top of the acid treating column and generally is recycled by means of a pump to the bottom of the column together with additional make-up acid as required. Usually the acid treatment is conducted at temperatures ranging from 60°-250° F. In a final step after the acid treatment to remove metallic deposits has been carried out, the catalyst particles are passed to a washing unit where the acid-treated particles are washed with water to remove the acid following which the recovered, washed catalyst particles are preferably dried in air or in air diluted with nitrogen at a temperature of about 150° to about 250° F. The process for removing metallic deposits from the catalyst particles is more completely described in U.S. Pat. No. 4,454,240, the disclosure of which is hereby incorporated by reference.

As previously pointed out, the alumina-based catalysts usually employed in ebullated-bed reactors operating under hydrodesulfurization conditions contain one or more metals with hydrogenating activity such as cobalt, molybdenum, nickel, phosphorus, tungsten and titanium and the reactivation process together with the regeneration and rejuvenation may result in removal of a part of the metals with hydrogenation activity from the catalysts. If needed, additional amounts of the required metals can be supplied to the reactivated catalyst particles by methods well known in the art.

Condensed steam/hydrocarbon/tar mixtures recovered from the steam treating zone may be separated using conventional means such as simply flashing off the water. The water recovered may then be recycled for steam generation and used, for example, in the generation of steam for use in the process of the invention. The hydrocarbon/tar mixture can be disposed of in a hydrogen generation unit utilized to produce hydrogen for use in a hydrotreating unit.

In another aspect, this invention relates to a hydrotreating process especially useful for producing low sulfur liquid products which comprises passing a metals contaminated hydrocarbon residuum feedstock having a metals content of from about 50 to about 500 wppm and a sulfur content of 2.0 to about 5 weight percent through multiple reaction zones in an upflow manner, with internal recycle of reactor liquid contents, under hydrogenation conditions of temperature and pressure in the presence of an alumina-supported catalyst containing one or more metals with hydrogenating activity such as cobalt, molybdenum, tungsten, phosphorus, nickel and vanadium which is ebullated in the liquid environment, adding fresh particulate high activity catalyst to the final reaction zone, withdrawing spent catalyst from the final reaction zone, reactivating the said spent catalyst by:

a) stripping process oil from the spent catalyst,
b) contacting the spent alumina-supported catalyst with steam at an elevated temperature of from 1000° to about 1250° F. and preferably at a temperature of about 1150° to about 1250° F. in a steam treating zone,
c) recovering a reactivated alumina-supported catalyst from the said steam treating zone, backstaging the recovered reactivated alumina-supported catalyst to said reaction zones in reverse flow relative to the residuum and introducing make-up hydrogen directly to the final reaction zone whereby the desulfurization rate is maintained at a maximum.

In another embodiment this invention relates to a two stage hydroconversion process for the production of low-sulfur, low boiling-range product streams, the unconverted residuum stream being blended to fuel oil, from a petroleum residuum having a sulfur content of about 2 to about 5 weight percent and more than 50 wppm of metallic compounds where the residuum is passed upwardly through each of two reaction zones in succession in the presence of hydrogen and under hydrogenation/hydroconversion conditions of temperature and pressure, both of the said zones containing a particulate alumina-supported catalyst which is placed in ebullation in the liquid phase environment by the upflow of said residuum and hydrogen and the internal recycle of reactor liquid products, the improvement which comprises:

(a) in the final reaction zone introducing a fresh, particulate, high activity alumina-supported hydrotreating catalyst containing one or more metals of hydrotreating activity such as cobalt, molybdenum, tungsten, phosphorus, nickel and vanadium,
(b) withdrawing spent catalyst from the final reaction zone, said spent catalyst being partially deactivated by carbon and metals deposited thereon in the final reaction zone,
(c) reactivating the spent catalyst by
  (A) stripping process oil from the spent catalyst,
  (B) contacting the spent alumina-supported catalyst with steam at an elevated temperature of from 1000° to about 1250° F. and preferably at a temperature of about 1150° to about 1250° F. in a steam treating zone,
  (C) recovering a reactivated alumina-supported catalyst from the steam treating zone,
(d) passing the entire effluent from the first reaction zone to the second final reaction zone,
(e) passing the reactivated catalyst from the final reaction zone to the first reaction zone, and
(f) withdrawing from the final reaction zone a liquid hydrocarbon stream which can be fractionated to recover the unconverted residuum stream with a boiling range of greater than or equal to 1000° F. and a sulfur content of about 2-3 weight percent which is suitable for blending to a low sulfur fuel oil product.

What is claimed is:

1. A process for reactivating a spent alumina-supported hydrodesulfurization catalyst used in treating metal contaminated hydrocarbon feedstocks, consisting essentially of an alumina support and containing one or more metals selected from the group consisting of cobalt, molybdenum, tungsten, nickel, phosphorus and vanadium which comprises:

a) stripping process oil from the spent catalyst by washing with a hydrocarbon solvent and drying the washed catalyst thus obtaining free-flowing spent catalyst,
b) contacting the free-flowing spent alumina-supported catalyst in a steam treatment zone with steam at a temperature ranging from about 1000° to about 1250° F., and
c) recovering a reactivated alumina-supported catalyst from the said steam-treating zone.

2. The process of claim 1 wherein the said alumina-supported hydrodesulfurization catalyst contains molybdenum and at least one metal selected from the group consisting of nickel and cobalt.

3. The process of claim 1 wherein the said alumina-supported hydrodesulfurization catalyst contains molybdenum and nickel.

4. The process of claim 1 wherein in step (a) the spent alumina-supported catalyst is stripped of process oil by washing with a hydrocarbon solvent selected from the group consisting of toluene, naphtha and mixtures thereof at a temperature of about 200° to about 300° F.

5. The process of claim 4 wherein the said hydrocarbon solvent is toluene.

6. The process of claim 4 wherein in step (a) the spent alumina-supported catalyst is stripped of process oil by washing with toluene at a temperature of about 230° and then dried in air at a temperature of about 250° F.

7. The process of claim 1 wherein in step (b) the steam temperature ranges from about 1150° to about 1250° F.

8. The process of claim 1 wherein in step (b) the spent alumina-supported catalyst is contacted with steam for a period of about 2 to about 5 hours.

9. The process of claim 1 wherein in step (b) the spent alumina-supported catalyst is contacted with steam for a period of about 2.5 to about 3.5 hours.

10. The process of claim 1 wherein the said recovered reactivated catalyst is regenerated by contacting the said reactivated catalyst with an oxygen-containing gas at a temperature of about 700° to about 900° F. to remove carbon deposits thereby providing a regenerated catalyst.

11. The process of claim 10 wherein prior to regeneration the said reactivated catalyst is treated at a temperature of from 60°-250° F. for at least about 5 minutes with an aqueous solution consisting of sulfuric acid and an ammonium ion whereby the metal contaminants are converted to their respective sulfate compounds and the said metal contaminants removed from the catalyst and afterwards washing the treated catalyst to remove the aqueous solution.

12. The process of claim 1 wherein in step (b) the spent alumina-supported catalyst is contacted with steam for a period of about 2 to about 5 hours at a temperature of about 1150° to about 1250° F.

13. The process of claim 1 wherein in step (a) the spent catalyst is dried at a temperature of less than 250° F. in air or air diluted with nitrogen.

14. The process of claim 1 wherein in step (a) the spent catalyst is dried at ambient temperature under vacuum conditions.

15. The process of claim 1 wherein in step (b) the free-flowing spent catalyst prior to being contacted with steam in the steam treating zone is heated to the steaming temperature with flowing nitrogen.

16. The process of claim 1 wherein in step (b) the free-flowing spent catalyst prior to being contacted with steam in the steam treating zone is heated to about 1000° to about 1250° F. with flowing nitrogen.

17. The process of claim 16 wherein in step (b) the free-flowing spent catalyst prior to being contacted with steam in the steam treating zone is heated to about 1000° F. with flowing nitrogen.

18. The process of claim 1 wherein in step (b) the said alumina-supported catalyst is contacted in the steam treating zone with steam diluted with up to 50% nitrogen.

* * * * *